Sept. 17, 1968
M. C. SZE
3,402,105
PACKED FRACTIONATING TOWER
Filed April 2, 1965
2 Sheets-Sheet 1
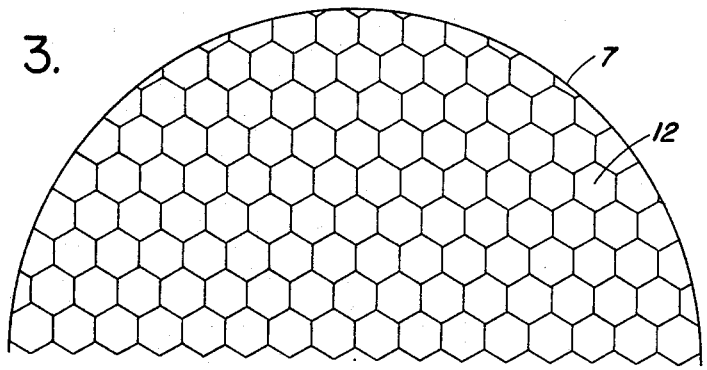
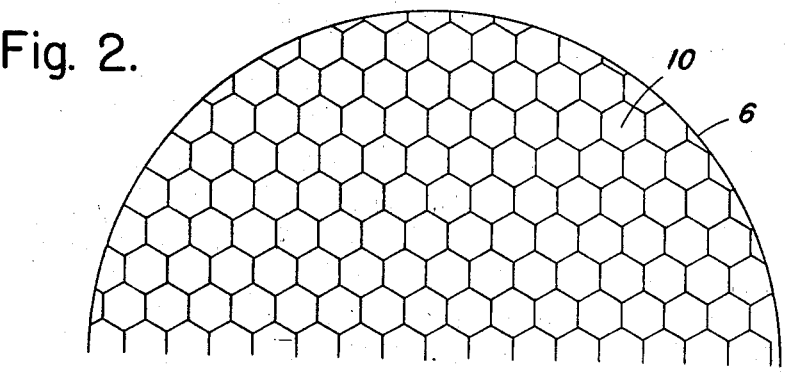
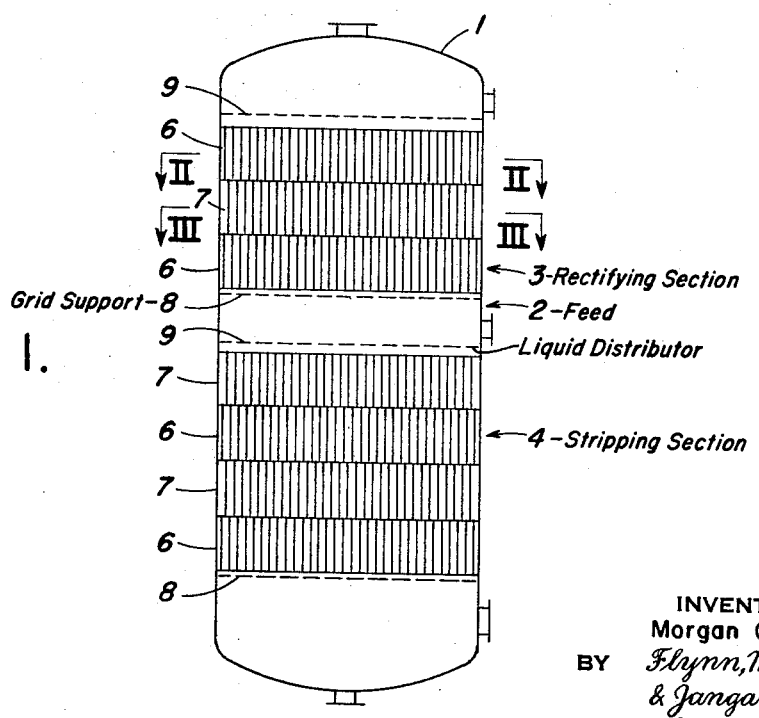
INVENTOR
Morgan C. Sze
BY Flynn, Marn
& Jangarathis
ATTORNEYS Sept. 17, 1968   M. C. SZE   3,402,105
PACKED FRACTIONATING TOWER
Filed April 2, 1965   2 Sheets-Sheet 2

INVENTOR
Morgan C. Sze
BY Flynn, Marn
& Jangarathis
ATTORNEYS

United States Patent Office 3,402,105
Patented Sept. 17, 1968

3,402,105
PACKED FRACTIONATING TOWER
Morgan C. Sze, Newark, N.J., assignor to The Lummus Company, New York, N.Y., a corporation of Delaware
Filed Apr. 2, 1965, Ser. No. 445,118
4 Claims. (Cl. 202—158)

ABSTRACT OF THE DISCLOSURE

A fractionation tower wherein the tower is divided into a plurality of parallel towers by providing a plurality of stacked trays having a plurality of packed vertical passages therein and arranging the trays so that the passages of adjacent trays are in a staggered relationship. The tower is particularly suited for separating close-boiling components.

---

This invention relates generally to an improved fractionating device for the separation of close-boiling components of a mixture, and, more particularly, to an improved packed tower design capable of operating on a commercial scale in a manner heretofore possible only on a laboratory scale.

There have been a multitude of designs and proposals for the vapor-liquid contact zones of fractionating towers. These have resulted in the use of a few types only, namely the well known bubble cap trays, perforated decks with or without valve means, slotted decks, packed towers and the like. All have some advantages and disadvantages. Bubble trays impose a pressure drop of some magnitude for each try, as do perforated decks, slotted decks, and the like, although the latter category usually impose lesser pressure drop per unit. Packed towers, using various sorts and sizes of packing impose various values of pressure drop and efficiency, dependent upon the type and size of packing used, but in many cases have the serious defect of channeling vapor and liquid flow, with resulting lack of efficient fractionation.

When the process of fractionation is directed to the separation of components of close boiling points such as, for example, the separation of propylene from propane or ethyl benzene from xylenes, tower efficiency becomes of very great importance. To illustrate by a pair of extremes, commercial bubble cap towers for the separation of the ethylbenzene may run into a total of 300 to 350 trays, usually contained in three or more towers operated in series, and the accumulated pressure drop through such a system is high. The high pressure drop tends to decrease relative volatility, resulting in a higher reflux ratio and/or more fractionating trays.

On the other hand, a small diameter packed column of laboratory size (one inch), packed with an appropriate small packing material such as 0.16" x 0.16" Cannon packing, giving a large factor of packing surface against tower cross section occupied, may accomplish the same separation in around 100 or so inches of tower height.

The difference revolves around that concept known as the "height of an equivalent theoretical plate" (H.E.T.P.), used to compare the efficiency of such systems. In a bubble cap system where each tray of bubble caps occupies from six to twelve or more inches of tower height, and the H.E.T.P. requires the use of say two such trays for a single stage of separation, the height total required is obviously much greater than in the laboratory packed column, where the H.E.T.P. may be of the order of one inch.

Translating the laboratory packed column to a commercial fractionator is not a simple matter. The major difficulty is primarily one of the diameter needed to handle commercial quantities of vapor and the resulting tendency of the liquids and vapors to channel in the larger diameter column with its larger packing material, greater interstices for vapor flow, and the like. As tower diameter and packing size increase, the H.E.T.P. becomes much higher and the benefits of the small laboratory column soon disappear.

It is thus a general object of the present invention to provide an improved packed tower design suitable for commercial scale operation which overcomes the foregoing problems.

A further object of the present invention is to provide an improved packed tower of sufficient diameter for commercial scale operation but with an H.E.T.P. closer to that found in small laboratory-scale packed towers.

Another object of the present invention is to provide an improved packed tower design wherein channeling of liquids and vapors is eliminated.

Yet another object of the present invention is to provide an improved packed tower having a substantially greater wettable surface for vapor-liquid contact per unit of height than has heretofore been possible in commercial scale packed towers.

Still another object of the present invention is to provide an improved packed tower design which is easy and economic to fabricate and maintain.

These and other objects and advantages of the invention will become clear in the course of the following description of an embodiment thereof, and the novel features will be particularly pointed out in connection with the appended claims. Understanding of the invention will be enhanced by referring to the accompaying drawings, which are illustrative only and are not to be interpreted in a limiting sense, and in which:

FIGURE 1 is a simplified, sectional view of a fractionating tower embodying the invention;

FIGURE 2 is a partial plan view of a deck, tray, or compartment in accordance with the invention, taken along line II—II of FIGURE 1, FIGURE 3 is similar to FIGURE 2, taken along line III—III of FIGURE 1;

Figure 4B:
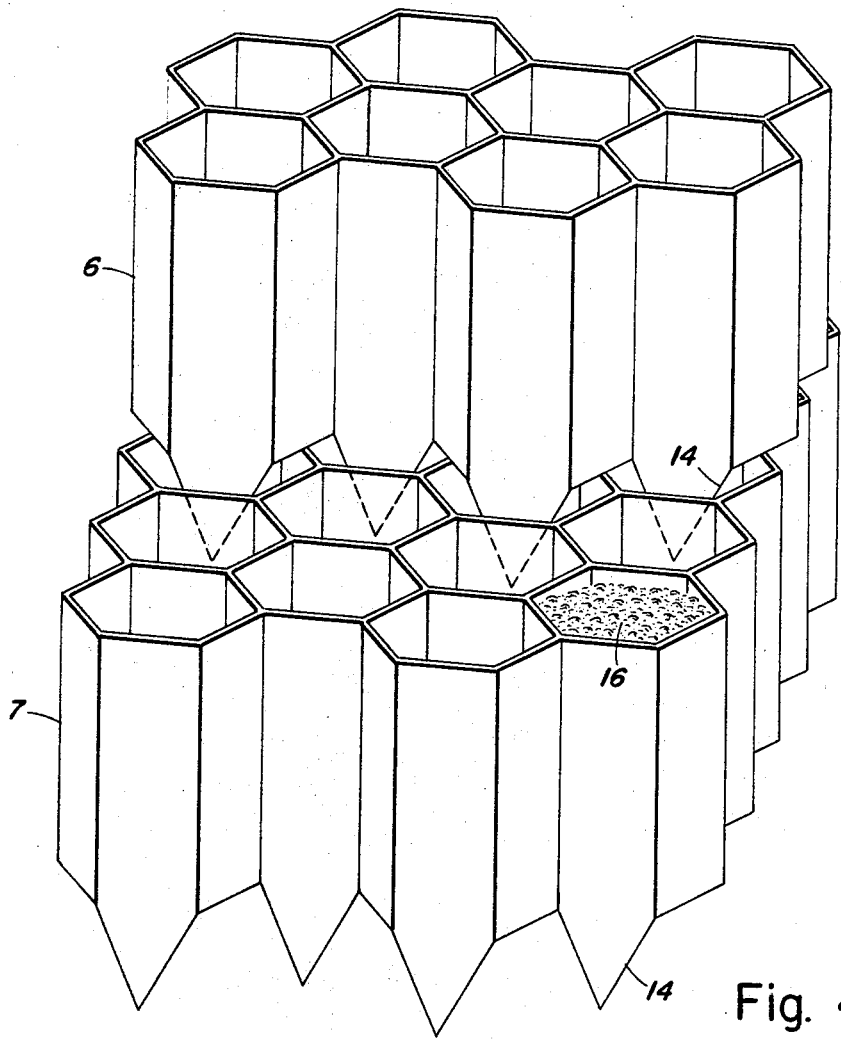
FIGURE 4b is a perspective view illustrating the manner in which adjacent trays fit together.

With reference to the drawings, FIGURE 1 shows a conventional fractionating tower 1, having a feed inlet 2 near its midpoint, a rectifying section 3 above said inlet and a stripping section 4 below. Conventional features such as reflux feeding means, stripping steam feeding means, reboilers and the like are not shown. The rectifying section and stripping section are made up of alternating trays 6 and 7, as shown, each group being supported by a grid 8 and each being topped by a liquid distribution plate or tray 9. The support grids 8 have sufficient structural rigidity to carry the superimposed weight, and have sufficient free opening to permit the uniform upflow of vapors across their surface while being capable of retaining upon their surface the material which packs the tower. These are conventionally achieved functions, and need not be further described. The liquid distributor plates or trays 9 contain perforations, slots, or the like, designed to give equal flow of liquid to all portions of the tower cross section, and at the same time afford a small, but effective resistance to upward flow of vapors so that this flow is also uniform across the tower cross section. These are also conventionally achieved functions. The novel features of the invention are found in the trays 6 and 7, as shown in FIGURES 2–4.

FIGURE 2 is a cross sectional view taken at about the mid-height of a tray 6. The term "tray" is in reality inaccurate for a tower section of this design, but it is used for ease of understanding and conformity with usual fractionating tower nomenclature. The tray 6 is seen to be formed of hexagonal tubular elements, without top or bottom, which may be formed of sheet or cast metal in any convenient manner. Metal noncorrosive in the expected environment is of course preferred. Such structure gives the tray 6 a multitude of vertical hexagonal passages 10 of restricted cross sectional area and of a height which is great compared to their width, preferably 10 to 20 times as great. The vertical surfaces of passages 10, wetted by liquid, are a part of the liquid-vapor contact system, and the hexagonal cross section provides a large area of wetted wall.

While the hexagonal cross-section for passages 10 as shown is not a functionally necessary feature of the invention there are several reasons for preferring this design, chief among which is the ease and inexpensiveness of fabrication. In the airframe industry, the fabrication and use of "honeycomb" structures has been developed to a high degree, due to the ability of such structures to bear substantial loads but yet be very light. The fabrication of such structures is remarkably simple. For example a group of thin, flat sheets of a readily deformable metal can be "printed" with a thermosetting adhesive applied in strips with predetermined spacing. A second group of sheets is printed with the adhesive strips in the alternate position. The two groups of sheets are then interleaved, clamped together and heated to set and cure the adhesive. When the resulting "sandwich" is pulled apart, a perfect honeycomb structure results. Of course, for purposes of the present invention an adhesive which is not attacked in service is required. Alternatively, of course, welding, rivetting or other metallic bonding methods can be employed.

Whether a complete tray or section is fabricated as a single piece or a plurality of sections fitted together in situ is a matter of choice depending on tower design. Such details are well within the ability of those skilled in the art.

FIGURE 3 is a cross sectional view similar to FIGURE 2 taken at about the mid-height of a tray 7. It has similarly shaped and proportioned vertical passages 12, corresponding to passages 10 in tray 6, and is constructed in the same general fashion.

While trays 6 and 7 are quite similar, their difference resides in the fact that when assembled one over the other, the center line of any vertical passage 10 in a tray 6 is over or nearly over the wall of a passage 12 in a tray 7. In other words, the passages in trays 6 and 7 are in a staggered relation.

Figure 4A:
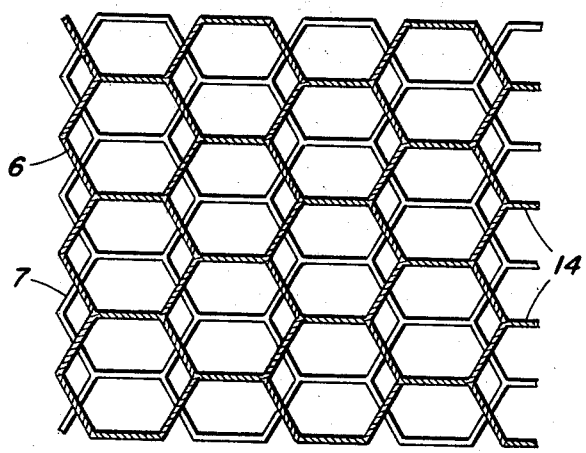
FIGURE 4a is a schematic diagram illustrating the relative positions of adjacent trays.

This is more clearly shown in FIGURE 4a, wherein tray 6 is shown in solid lines and tray 7 is shown in dotted lines. As can be seen from this drawing, liquid flowing down the walls of tray 6 will not continue down the walls of tray 7, but rather will flow into the packing in tray 7. Further, this arrangement provides solid support of one tray by another since all points of contact are at a substantial angle.

The tendency of liquids to channel within the tower is further reduced by adding tips to the nonsupported ends of each section, as shown in FIGURE 4b. Thus, the two unsupported walls in each section of tray 6 are provided with tips 14 which extend down into the packing (not shown) in tray 7. As is clear by referring again to FIGURE 4a where one of the walls having a tip 14 is indicated, the tip will not even come close to any wall of tray 7, and so liquid travelling down the wall of tray 6 will be deposited essentially in the middle of the packing in tray 7. Tray 7 is provided with tips 14 in a similar fashion. Of course, the bottom tray in either section does not have any tips, so that it rests firmly on screen 8.

In use, each of the vertical passages in the several trays is filled with a tower packing maerial indicated at 16 in FIGURE 4b. The packing to be so used is preferably of rather small size, of a kind that presents a high ratio of wetted surface to cross sectional area of tower occupied. Special ceramic shapes, formed metal spirals, shaped portions of metal fabric and the like are operable, the choice frequently being dependent upon the nature of the materials being fractionated, but the major criterion being a capability of adequately filling all portions of the vertical passages so as to insure adequate contact of vapor and liquid.

The principle of this invention is thus seen to be the division of the cross section of a packed tower into a large number of vertical passages preferably having a length of width ratio of at least 10/1, all of said vertical passages being packed with a packing material whose surface to cross section ratio is high, with the passages of a given section of the tower being so alternated that the central area of one passage is in register with the wall section of the passages next above and below, coupled with the downward extension of a portion of the wall of each such passage to direct liquid from such wall into the central portion of the vertical passage therebelow.

In effect, the present invention provides a large number of small-scale packed towers within a single enclosure of commercial scale. The result is that components with very close boiling points can be readily separated, in volume, in a single inexpensive tower. For example, a tower built according to the invention and having a diameter of 20′, has an H.E.T.P. of 2″, a figure which is closer to the laboratory-scale packed towers than to commercial bubble cap towers. Moreover, the tower of the invention is free from channeling and other defects common in large scale packed towers.

It will be understood that various changes in the details, material, steps and arrangements of parts, which have herein been described and illustrated in order to explain the nature of the invention, may be made by those skilled in the art within the principle and scope of the invention as expressed in the appended claims.

What is claimed is:

1. In a packed fractionating tower for separating close boiling components of a mixture the combination comprising:

a plurality of vertically stacked overyling stacked trays, each of said trays occupying the entire cross-sectional area of said tower and comprising
        a lurality of vertical wall sections forming a honeycomb structure having a plurality of elongated vertical cellular passages; packing material filled within each of said vertical passages and the vertical passages of the overlying trays being in vertical fluid communication,
        the wall sections of one tray being in essentially a staggered relation with the wall sections of adjoining trays, the lower ends of the vertical wall having pointed projections extending downwardly thereof into the vertical passage of the next lower tray; and
    means for supporting said stacked trays within said tower.

2. A fractionating tower as claimed in claim 1, wherein said elongated passages have a length to width ratio of at least 10 to 1.

3. A fractionating tower as claimed in claim 1 wherein the lower pointed projection of said wall sections as are directly above the vertical passages of the tray next below are arranged to extend into the packing in said next below passages.

4. A fractionating tower as claimed in claim 1, and additionally comprising fluid distribution means over the uppermost of said trays and capable of delivering a fluid to each of said packed, vertical passages and wherein said packing material is of relatively small size.

References Cited

UNITED STATES PATENTS

| | | | |
|---|---|---|---|
| 2,051,545 | 8/1936 | Collins | 202—158 X |
| 3,038,843 | 6/1962 | Doumani | 202—158 X |
| 3,081,987 | 3/1963 | Meek et al. | 261—112 |
| 3,227,429 | 1/1966 | Renzi | 261—112 |
| 3,243,170 | 3/1966 | Ellis et al. | 202—158 X |
| 3,256,001 | 6/1966 | Renzi | 261—112 X |

FOREIGN PATENTS

| | | |
|---|---|---|
| 576,074 | 5/1959 | Canada. |
| 53,700 | 1890 | Germany. |

NORMAN YUDKOFF, *Primary Examiner.*

F. E. DRUMMOND, *Assistant Examiner.*